(12) United States Patent
Shayne et al.

(10) Patent No.: US 12,440,151 B2
(45) Date of Patent: Oct. 14, 2025

(54) INFRARED SLEEP MONITORING

(71) Applicant: ObjectVideo Labs, LLC, Tysons, VA (US)

(72) Inventors: Ethan Shayne, Clifton Park, NY (US); Dana Eubanks, Herndon, VA (US); Donald Gerard Madden, Columbia, MD (US)

(73) Assignee: ObjectVideo Labs, LLC, Tysons, VA (US)

( * ) Notice: Subject to any disclaimer, the term of this patent is extended or adjusted under 35 U.S.C. 154(b) by 310 days.

(21) Appl. No.: 17/173,977

(22) Filed: Feb. 11, 2021

(65) Prior Publication Data

US 2021/0251568 A1    Aug. 19, 2021

Related U.S. Application Data

(60) Provisional application No. 62/976,904, filed on Feb. 14, 2020.

(51) Int. Cl.
*A61B 5/00* (2006.01)
*A61B 5/01* (2006.01)
*G16H 20/00* (2018.01)

(52) U.S. Cl.
CPC .......... *A61B 5/4812* (2013.01); *A61B 5/0008* (2013.01); *A61B 5/015* (2013.01); *A61B 5/4809* (2013.01); *A61B 5/7405* (2013.01); *A61B 5/4815* (2013.01); *A61B 2560/0252* (2013.01); *G16H 20/00* (2018.01)

(58) Field of Classification Search
CPC ..... A61B 5/4812; A61B 5/0008; A61B 5/015; A61B 5/4809; A61B 5/7405; A61B 5/4815; A61B 2560/0252; A61B 5/0022; A61B 5/6889; G16H 20/00; G16H 50/30; G16H 40/67
See application file for complete search history.

(56) References Cited

U.S. PATENT DOCUMENTS

| 11,771,367 | B1 * | 10/2023 | Pulkkinen | A61B 5/01 705/2 |
| 2011/0257712 | A1 * | 10/2011 | Wells | A61B 5/4812 607/90 |
| 2012/0289850 | A1 * | 11/2012 | Xu | A61B 5/015 |
| 2013/0245465 | A1 * | 9/2013 | Kasama | A61B 5/4812 600/483 |

(Continued)

OTHER PUBLICATIONS

Li S, Chiu C. A Smart Pillow for Health Sensing System Based on Temperature and Humidity Sensors. Sensors. 2018 (Year: 2018).*

*Primary Examiner* — Pascal M Bui Pho
*Assistant Examiner* — Gabriel Victor Popescu
(74) *Attorney, Agent, or Firm* — Fish & Richardson P.C.

(57) ABSTRACT

Systems, devices, and methods for monitoring a person's sleep are described. Thermal images of a person sleeping can be captured using an infrared camera and processed to determine the body temperature of the person. A particular sleep stage and its duration can be determined using the body temperature. In addition, the data obtained from monitoring the person can be used to determine if the person is suffering from one or more sleep disorders or other health problems. In this manner, a person's sleep quantity and quality can be determined in a non-invasive, efficient, and comfortable manner.

20 Claims, 5 Drawing Sheets

(56) References Cited

U.S. PATENT DOCUMENTS

| | | | |
|---|---|---|---|
| 2014/0313309 A1* | 10/2014 | Matsuo | A61B 5/015 |
| | | | 348/78 |
| 2014/0371547 A1* | 12/2014 | Gartenberg | A61B 5/4812 |
| | | | 600/301 |
| 2017/0188938 A1* | 7/2017 | Toh | A61B 5/4809 |
| 2017/0281017 A1* | 10/2017 | Halperin | A61B 5/4812 |
| 2018/0078197 A1* | 3/2018 | Ware | A61B 5/4809 |
| 2018/0085050 A1* | 3/2018 | Grandner | A61B 5/0022 |
| 2018/0214091 A1* | 8/2018 | Baker | A61B 5/4815 |
| 2018/0338724 A1* | 11/2018 | Shan | A61B 5/4809 |
| 2019/0053754 A1* | 2/2019 | Gowda | A61B 5/7264 |
| 2019/0090860 A1* | 3/2019 | Shinar | A61B 5/0816 |
| 2019/0183415 A1* | 6/2019 | Rytky | A61B 5/4812 |
| 2019/0328320 A1* | 10/2019 | Lim | A61B 5/08 |
| 2020/0196942 A1* | 6/2020 | Ozturk | A61B 5/015 |
| 2020/0265823 A1* | 8/2020 | Kremer | A61B 5/4815 |
| 2020/0281521 A1* | 9/2020 | Cail | A61B 5/7405 |
| 2021/0178113 A1* | 6/2021 | Bresch | G16H 20/00 |
| 2022/0133589 A1* | 5/2022 | Gruneberg | A61B 5/015 |
| | | | 601/1 |

* cited by examiner (BEFORE EVENT)

EMPTY ROADWAY (AFTER EVENT)

INFRARED SLEEP MONITORING

CROSS-REFERENCE TO RELATED APPLICATION

This application claims the benefit of U.S. Application No. 62/976,904, filed Feb. 14, 2020, the contents of which are incorporated by reference.

FIELD

This disclosure generally relates to monitoring sleep behavior using thermal imagery.

BACKGROUND

Monitoring the quantity and quality of sleep patterns is an important measure of a person's health. Techniques to perform such monitoring can often be intrusive or compromise sleeping habits. Accordingly, there is a need for improved methods for monitoring sleep.

SUMMARY

This disclosure generally describes systems and methods for monitoring sleep.

According to implementations described herein, a sleep monitoring system may include an infrared camera to capture thermal images of a person. The thermal images may be further processed to determine the body temperature of the person. A particular sleep stage and its duration may be determined using the body temperature. In addition, the data obtained from monitoring the person may be used to determine if the person is suffering from one or more sleep disorders or other health problems. Advantageously, in this manner, the sleep monitoring system may determine the quantity and quality of a person's sleep in a non-invasive, efficient, and comfortable manner.

In some implementations, the sleep monitoring system may also take actions to improve the quality of life of the person being monitored. For example, the sleep monitoring system may generate recommendations for improving the quality of sleep and may inform the person that the person may have a particular health risk. In some cases, the sleep monitoring system may generate a report providing the user with feedback regarding the person's sleep quality. The report may indicate whether the person is spending adequate time in each stage of sleep. In some cases, the sleep monitoring system may configure an alarm on the person's personal electronic device based on the person's sleep patterns and characteristics.

According to some aspects of the disclosure, a computer-implemented method can be implemented that includes operations of obtaining a thermal image of a person using an infrared camera, determining a body temperature of the person based on the thermal image, determining a sleep stage of the person based on the body temperature, and providing data indicative of the sleep stage to an electronic device associated with the person.

In some implementations, determining the body temperature of the person based on the thermal image includes determining one or more temperatures of one or more parts, respectively, of a body of the person, identifying one or more weights associated with the one or more parts, respectively, of the body of the person, and determining an aggregate body temperature of the person based on the one or more temperatures of the one or more parts and the one or more weights associated with the one or more parts of the body of the person.

In some implementations, the one or more weights associated with the one or more parts, respectively, of the body of the person includes a first weight and a second weight. The first weight is designated to a first part of the body that is not exposed to an ambient environment. The second weight designated to a first part of the body that is exposed to the ambient environment. The first weight is greater than the second weight.

In some implementations, determining the sleep stage of the person based on the body temperature includes mapping the aggregate body temperature to a particular sleep stage. The particular sleep stage includes one of a stage one light sleep, a stage two light sleep, and a stage three deep sleep.

In some implementations, mapping the aggregate body temperature data to the particular sleep stage includes determining that the person is in the stage one light sleep when the aggregate body temperature of the person is within a first range of body temperatures associated with the stage one light sleep, determining that the person is in the stage two light sleep when the aggregate body temperature of the person is within a second range of body temperatures associated with the stage two light sleep, or determining that the person is in the stage three deep sleep when the aggregate body temperature of the person is within a third range of body temperatures associated with the stage three deep sleep.

In some implementations, determining the sleep stage of the person based on the body temperature includes determining the body temperature of the person at a first time, determining the body temperature of the person at a second time different from the first time, determining a change in the body temperature of the person between the first time and the second time, and determining the sleep stage of the person based on the change in the body temperature.

In some implementations, the computer-implemented method operations include determining an alarm time based on the sleep stage of the person, and transmitting instructions to the electronic device to set an alarm at the alarm time.

In some implementations, the computer-implemented method operations include one or more of determining a time period of the sleep stage that the person was at when the thermal image was obtained based on the thermal image and the body temperature, and determining a sleep disorder based on the thermal image and the body temperature.

In some implementations, the computer-implemented method operations include generating a message that includes one or more of a recommendation to improve sleep quality of the person, and a report indicative of the sleep quality of the person.

In some implementations, the computer-implemented method operations include performing calibration by determining a first initial body temperature of the person before the person adopts a sleeping position, determining a second initial body temperature of the person after the person adopts a sleeping position, obtaining data indicative of an environment around the person when the person adopts the sleeping position, and compensating data obtained for determining the body temperature of the person based on the first initial body temperature, the second initial body temperature, and the data indicative of the environment around the person. The data indicative of the environment around the person includes one or more of data indicative of an ambient temperature and humidity around the person;

In some implementations, a system includes an infrared camera and a processor. The infrared camera is operable to obtain a thermal image of a person. The processor is coupled to the infrared camera over a wired or wireless network. The processor is operable to receive the thermal image from the infrared camera, determine a body temperature of the person based on the thermal image, determine a sleep stage of the person based on the body temperature, and transmit data indicative of the sleep stage to an electronic device associated with the person.

According to some aspects of the disclosure, a non-transitory computer-readable storage medium including instructions that, when executed by a processor, causes the processor to perform operations. The operations include obtaining a thermal image of a person using an infrared camera, determining a body temperature of the person based on the thermal image, determining a sleep stage of the person based on the body temperature, and providing data indicative of the sleep stage to an electronic device associated with the person.

Other implementations include corresponding systems, apparatus, computer-readable storage media, and computer programs configured to implement the actions of the above-noted methods.

The details of one or more implementations are set forth in the accompanying drawings and the description below. Other features and advantages will become apparent from the description, the drawings, and the claims.

BRIEF DESCRIPTION OF THE DRAWINGS

Like reference numbers and designation in the various drawings indicate like elements.

DETAILED DESCRIPTION

Figure 1:
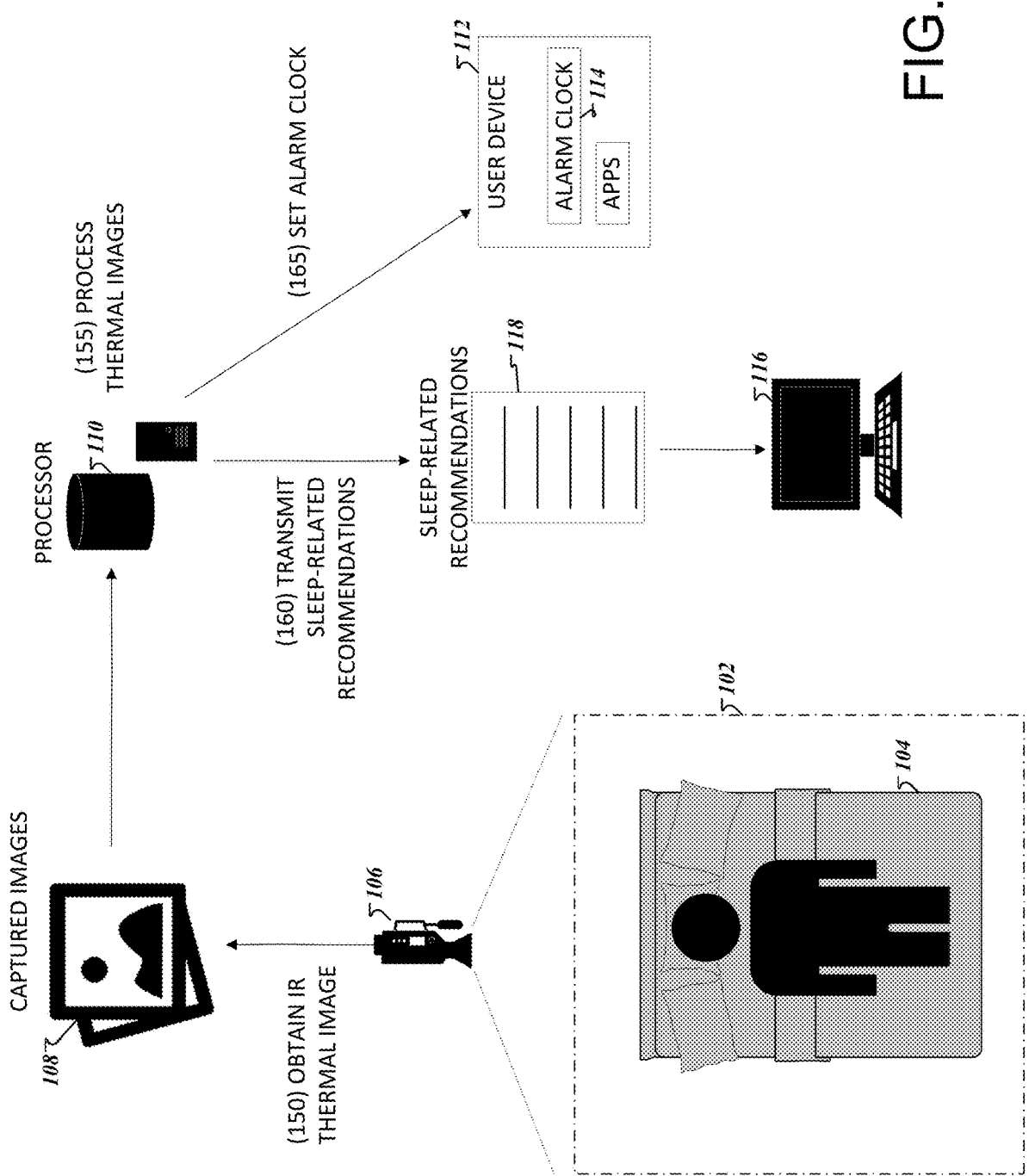
FIG. 1 depicts an example of a sleep monitoring system.

Referring to FIG. 1, a sleep monitoring system can include a processor 110 and one or more monitoring mechanisms such as camera 106. The camera 106 can be utilized to monitor a resting area 102 associated with a subject such as an area that includes a bed 104, a couch, or a futon on which the subject typically takes rest. The subject can refer to a person interested in having his or her sleep behavior observed, recorded, and/or examined. The camera 106 can be located at any suitable location that allows a clear view of the resting area 102. For example, in some cases, the camera 106 can be placed above the bed 104 in a ceiling or in a top corner of a room in which the resting area 102 is located such that images of the subject while asleep on bed 104 can be obtained without any obstruction.

The camera 106 may be an infrared camera for obtaining thermal images. In general, an infrared camera may be used to obtain images using infrared radiation, e.g., between approximately 9,000-14,000 nanometers or 9-14 µm, that is invisible to humans. Infrared radiation detected by the infrared camera can be used to determine heat signatures of the items within view of the camera, and a thermal image can be generated based on the determined heat signatures. For example, in some implementations, different colors or intensities are assigned to particular temperatures or heat signatures thereby allowing an image to include a thermal representation of the objects within view of the camera lens. Accordingly, warm objects may stand out against cooler backgrounds, and humans may become easily visible against the environment, day or night. In some implementations, raw infrared data values can be used to convert image data to human-visible color. In this way, if a person is lying in their bed, thermal images of the person immediately before and/or after the person lies in bed may be obtained. The before and after images may be used for calibration purposes (explained in more detail below) to reflect the change in a person's body temperature before and after the person enters a bed.

Depending on the application, the camera 106 may be a high resolution camera or a low resolution camera. For example, in some cases, a low resolution camera can be utilized to obtain low resolution thermal images to provide privacy to a subject such that particular features of a subject (e.g., the face) cannot be identified. In some cases, if the sleep monitoring system is to be used to analyze particular characteristics of the subject such as the amount of perspiration or eye movement during sleep, a high resolution camera may be used.

Additional steps may be taken to preserve a subject's privacy. For example, a subject may be informed of the type of data and images that may be collected during a monitoring session of the subject. The subject may be provided with controls allowing the subject to elect if and when the sleep monitoring system described herein may collect data on the subject's sleeping habits and patterns or training of neural networks. The subject may select the type of data being collected during a sleep monitoring session. The subject may also elect to receive recommendations regarding the subject's sleeping habits and/or improving the subject's sleep.

Subject data collected may be treated in one or more ways before it is stored or used, so that personally identifiable information is removed. For example, a subject's identity may be treated so that no personally identifiable information can be determined for the subject, or a subject's geographic location may be generalized where location information is obtained (such as to a city, ZIP code, or state level), so that a particular location of the subject cannot be determined. Thus, the subject may control what information is collected, how that information is used, and what information is provided to the subject.

In some cases, to protect a subject's privacy, all data collection and processing may be securely performed on site (i.e., where the data is collected) so that the data is not exposed to third parties or susceptible to being intercepted during wired or wireless transmissions to other locations. For example, if sleep monitoring data is collected at a subject's home, the sleep monitoring data can be processed to remove personally identifiable information and satisfy the privacy settings of the subject before the sleep monitoring data is transmitted to any remote electronic device, server, or processor located away from the subject's home.

Referring back to FIG. 1, the camera 106 may obtain (150) infrared thermal images 108 of a subject in the resting area 102. In some cases, the camera 106 may receive instructions from a processor 110 to capture thermal images.

In some cases, the camera 106 may be programmed to capture thermal images periodically or at particular times of the day.

The processor 110 may receive the captured images 108 from camera 106. As described in more detail below, the camera 106 and processor 110 may include wired and wireless communication units for facilitating wired and wireless communications. These communication units include, but are not limited to for example, mixers, filters, antennas, amplifiers, multiplexors, and various other hardware and/or software modules or circuitry for executing communications over short and/or long distance networks. In some cases, camera 106 and processor 110 may execute various suitable communication protocols, e.g., Bluetooth™, WiFi, and, in general, any short and/or long distance communication protocol to facilitate data communication. The processor 110 may be connected to the same or different network to which the camera 106 is connected.

In some implementations, the processor 110 may be located in the same building, e.g., the subject's home, in which the thermal images 108 were captured. For example, the processor 110 may be a part of a home monitoring system, a control unit, a home server, or a gateway device that is capable of receiving camera images or home security information from multiple monitoring sources. The processor 110 may be configured to communicate with devices within the building and/or external to the building. In some implementations, the processor 110 may be coupled to one or more memory devices or databases, e.g., a customer database or image database, and may store or obtain data from the memory devices or databases.

The memory device may be any suitable storage device including volatile or non-volatile. The memory device may include one or more mass storage devices, for example, magnetic, magneto optical disks, optical disks, EPROM, EEPROM, flash memory devices, and may be implemented as internal hard disks, removable disks, or magneto optical disks. In some implementations, the memory device may include a non-tangible computer-readable storage medium that contains instructions, which when executed, perform one or more methods or portions of the methods described in this disclosure.

In some implementations, the processor 110 may be located at a different location from which the thermal images 108 were captured. For example, the processor 110 may be part of a remote server, processor, or electronic device that is configured to receive and process thermal images.

In general, the processor 110 is configured to process (155) thermal images 108 (2) received from camera 106 and may include hardware and/or software for processing the thermal images 108. Various suitable image processing methods, algorithms, and techniques may be used by the processor 110.

In some implementations, the processor 110 can extract body temperature data associated with the subject from the thermal images and determine a stage of sleep of the subject based on the body temperature data. For example, based on the thermal image of the subject, the processor 110 may determine the subject's body temperature at one or more parts of the subject's body. The processor 110 may determine an aggregate body temperature based on the temperature associated with the one or more parts of the subject's body.

In some cases, the processor 110 may apply different weights to different parts of the subject's body to determine the aggregate body temperature. For example, because the feet or hands are often outside of a subject's blanket or comforter and may be cooler than the chest or waist area of a subject's body, a higher weight may be assigned to the temperatures associated with the chest and waist relative to the body temperature of the hands and feet.

One or more criterion can be utilized to assign weights to the different body parts. For instance, in the example above, the areas of a subject's body that are likely not to be exposed to the ambient environment (by virtue of being covered by a blanket) can be assigned a higher weight. The areas of the subject's body that are likely to be exposed to the ambient environment (by virtue of not being covered by a blanket) can be assigned a lower weight. In another example, the obtained body temperature may be assigned weight in a temporal manner such that body temperature information obtained in first 30-60 minutes is assigned less weight than body temperature information obtained thereafter to factor in a period of time to accommodate any latency effects on the subject's body temperature.

In some implementations, physiological temperatures may be used as a criterion to assign weights. For example, certain parts of the human body may generally be cooler than other parts of the human body. Different parts of the human body may be assigned different weights based on the expected physiological temperatures.

In some cases, the processor 110 may, in communication with a storage device, maintain a log of the subject's sleeping times, preferences, and habits, and may determine one or more sleeping patterns from the data received from the camera 106 and other components of the home monitoring system. For example, the processor 110 may determine the hours during which the subject is sleeping most frequently, the stage(s) of sleep a subject is in at a particular time, the average number of hours of sleep, the time(s) of day the subject sleeps, the number of events in a subject's sleep during a particular time period, the time the subject takes to achieve a particular stage of sleep, and/or the time the subject takes to leave the bed after waking up from sleep or exiting a particular stage of sleep.

In some cases, the processor 110 may map a subject's aggregate body temperature data to a particular stage of sleep. Sleep stages include three stages of non-rapid eye movement (NREM) sleep, which include: 1) Stage 1 light sleep; 2) Stage 2 light sleep; and 3) Stage 3 deep sleep.

During the first stage—Stage 1 light sleep—the subject may experience one or more transitions between being awake and being asleep. This is the lightest stage of sleep when the subject may feel as if the subject were still awake. A subject's brain wave activity slows down, body muscles relax, and eye movement is slow.

During the second stage—Stage 2 light sleep—the subject does not transition as often between being awake and asleep and is in deeper state of sleep. Memory consolidation and synaptic pruning occurs during this stage. Slow eye movement may discontinue, brain wave activity further slows down with occasional sleep spindles intertwined with K complexes. Heart rate and body temperature generally also begin to decrease in this stage.

During the third stage—Stage 3 deep sleep—the subject is in a deep state of sleep, does not awake much and slower brain wave activity, blood pressure, and heart rates may be experienced. Although the subject may not move much in this stage, parasomnias such as sleep walking, night terrors, bed wetting, and sleep talking may occur in this stage. The third stage may also include a REM phase during which the subject may experience vivid dreams with increased brain wave activity. During the REM phase, the body remains largely motionless but the subject's eyes may move rapidly underneath the eyelids. Due to the increased brain wave activity, often times this phase corresponds to an increase in the temperature in region corresponding to the subject's brain. Often times, the lowest body temperatures are reached during the REM phase, even though a subject's heart rate and blood pressure may increase.

The duration of each stage varies from subject to subject. In general, the first three stages typically last four to seven hours a night, and the REM phase in Stage 3 may last for 90 to 120 minutes a night. The sleep stages may not follow a particular sequential order and may occur at different times in a night with one or more occurrences. In general, a subject's body temperature may drop when the subject enters Stages 1 or 2 and again when the subject enters Stage 3.

Because a person's body temperature varies from one stage to another, a map has been determined to correlate a person's body temperature to the particular sleep stage the person is in. Processor 110 may utilize such a mapping to map the subject's body temperature to a particular stage of sleep based on the thermal images obtained during the subject's observed sleep. For instance, if a subject's thermal images indicate that the subject's body temperature is at a particular temperature or within a particular range of temperatures associated with a particular stage of sleep, the processor 110 may determine that the stage of sleep that corresponds to the particular temperature or range of temperatures is the subject's sleep stage.

In some cases, the subject's sleep stage may be determined by a relative change in body temperature. For example, the processor 110 may determine that the subject is in in light-stage sleep (e.g., Stage 2) when the subject's temperature drops by a predetermined number of degrees compared to initial readings for that night.

Furnished with data associated with a subject's sleeping habits, patterns, and stages of sleep, the processor 110 is also configured to take a number of actions to help improve the subject's quality of life. In some implementations, the processor 110 may communicate with one or more user devices 112 and 116 associated with the subject, provide the user devices 112 and 116 with feedback regarding the subject's sleep, and take one or more actions based on the subject's sleep patterns.

For instance, the processor 110 may determine a number of hours that the subject has slept for a determined period of time, e.g., the previous three days, and the duration of various stages of sleep in the determined period of time when the subject's sleep was being monitored and thermal images were being taken. The processor 110 may then transmit (160) sleep related recommendations 118 to user device 116 for the subject to increase the quantity of sleep hours and recommendations for improving the quality of sleep. In another example, the processor 110 may determine that the subject's sleeping patterns are similar to a particular sleep disorder, e.g., insomnia, restless leg syndrome, and may transmit a recommendation for a doctor's visit to user device 116 due to a likelihood that the subject has the particular sleep disorder.

For example, if the thermal images and sleep monitoring of a subject indicates that the subject frequently moves the subject's legs when the subject's aggregate body temperature (and/or change in body temperature) corresponds to a particular stage of sleep, the processor 110 may determine that there is a high likelihood that the subject is experiencing restless leg syndrome during the particular stage of sleep. The processor 110 may then transmit a recommendation for a doctor's visit to the user device 116. In general, the processor 110 may utilize a mapping table that maps thermal images, aggregate body temperatures, and/or symptoms of various sleep disorders that can be detected through sleep monitoring to the various sleep disorders.

In some implementations, the processor 110 may determine when to set an alarm clock 114 based on the subject's sleeping patterns. For example, the processor 110 may be configured to determine an alarm time when the subject enters the first stage of sleep at the end of a night's sleep. The processor 110 may determine such an alarm time based on real-time sleep data of a subject such as the subject's average hours of sleep during a determined number of immediately preceding nights, the most likely time the subject will terminate the last stage of sleep, and/or a time requested by the subject. When such an alarm time is determined, the processor 110 may send (165) instructions to user device 112 to set its alarm clock 114 according to the determined alarm time. Authorization for configuring or sending data to user devices 112, 116 may be obtained in advance from the subject.

In some implementations, the processor 110 may determine that additional thermal images are needed and may transmit instructions to camera 106 to obtain additional images. For example, if a subject has entered the first stage of sleep during an initial portion of a subject's sleep, the processor 110 may instruct camera 106 to obtain additional images to continue monitoring the subject's sleep. In another case, based on the received images, the processor 110 may determine that the subject has moved away from the bed 104 in the resting area 102 and may transmit instructions to the camera 106 to cease taking additional images. In some cases, the processor 110 may send a command to camera 106 to begin obtaining images if the camera 106 is not being used to capture images prior to the command.

In some implementations, the processor 110 may send an electronic file, or an Internet resource link (e.g., webpage link) to a user device 112/116. In some implementations, the processor 110 may also send a request for the subject to complete a survey or to send feedback regarding one or more recommendations that the processor 110 may have previously sent.

Figure 2:
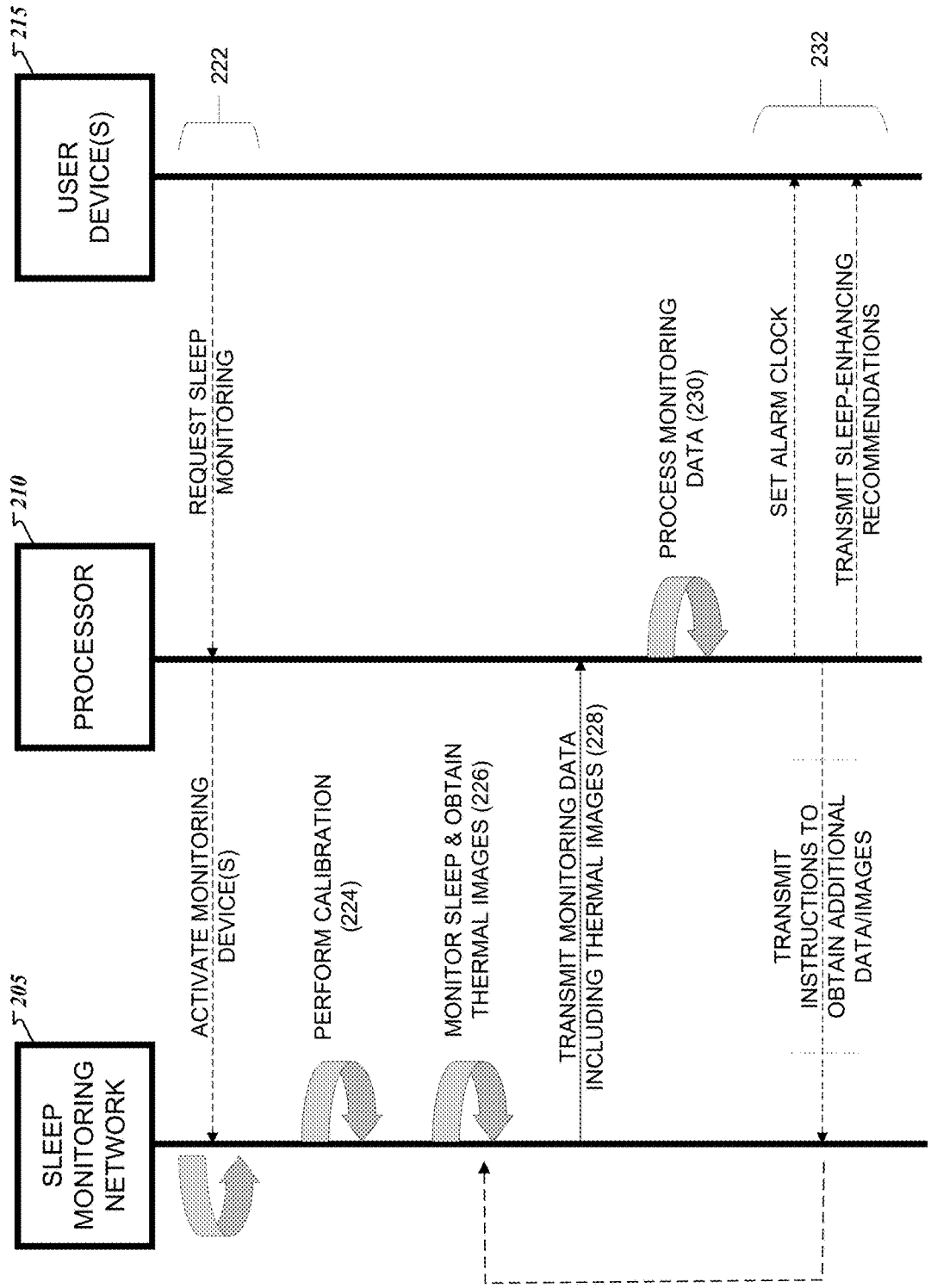
FIG. 2 depicts an example interaction diagram between a sleep monitoring system, a processor, and a user device(s) according to a sleep monitoring method.

FIG. 2 provides additional details and an example flowchart of the sleep monitoring method discussed above with respect to FIG. 1. In particular, FIG. 2 depicts operations executed by a system including a sleep monitoring network 205, a processor 210, and user device(s) 215 during an example flowchart of a sleep monitoring method. The sleep monitoring network 205 may include an infrared camera such as camera 106. The sleep monitoring network 205 may also include various additional monitoring devices, including but not limited to, motion sensors, touch sensors, and thermometers.

The processor 210 may include a processor such as processor 110. User device(s) 215 may be any suitable portable electronic computing device capable of displaying electronic data. The user device(s) 215 may be owned, rented, licensed, or associated in any manner with the subject. The user device(s) 215 may be, for example, a smart phone, a tablet computer, a laptop computer, a personal digital assistant device, an electronic pad, a smart watch, a smart glass, or any electronic device with a display that is connected to a network.

Referring to FIG. 2, the sleep monitoring method may be initiated by activating the sleep monitoring device(s) (222). This can be done in several ways. In one example, processor 210 may transmit instructions to the sleep monitoring network 205 to begin monitoring a subject's sleep. As described above, the processor 210 and the sleep monitoring network 205 may communicate through wired or wireless communications.

In another example, the sleep monitoring network 205 may be programmed to begin monitoring the subject's sleep at a particular day and time. In another example, the sleep monitoring network 205 may be programmed to execute sleep monitoring operations 224-232 when a particular condition is satisfied. This condition may be variably set, examples of which include, for example, when a subject is detected within or in proximity to a resting area or when a subject has been lying in bed for a threshold period of time, e.g., three minutes.

In another example, a subject may have recently subscribed to a sleep monitoring service, and upon completion of the subscription process, a signal may be transmitted from the user device(s) 215 to the processor 210 to initiate the sleep monitoring service for the subject associated with the user device(s) 215. The processor 210 may then transmit instructions to the sleep monitoring network 205 to begin monitoring the subject's sleep at a desired time and in accordance with the terms of the sleep monitoring service.

After activating the sleep monitoring network 205, the sleep monitoring network 205 may obtain data for calibrating sleep monitoring data (224). Calibration may be performed to compensate the effects of environmental factors such as air temperature, humidity, bedding materials, bed linens, and/or a subject's nightwear. As an example, calibration may be performed by observing the body temperature of the subject via the thermal camera immediately prior and after getting into bed, and then again after allowing time for temperatures to equalize. In another example, if the sleep monitoring network 205 includes a thermometer or humidity meter, the sleep monitoring network 205 may obtain room temperature and humidity measurements before and after the subject got into bed. In some cases, if available, information regarding the material of the bed sheets, covers, pillows, and comforters may also be used as calibration data.

Calibration may also be used to obtain data indicative of the presence of additional people or objects on the subject's bed. For example, if two people including the subject are in physical contact, the subject's body temperature may be affected by the other person's body temperature. In such cases, the sleep monitoring network 205 may send the processor 210 an indication that an additional person or object was present and that sleep data could be impacted by the additional person or object.

In some implementations, data from other sensors and devices can be used to facilitate baseline per-subject calibration. For example, visual data from non-infrared cameras can correlated with infrared camera data. Data from a temporarily-worn wearable device (e.g., smart watches) can be correlated with infrared camera data. Data from "smart bed" sensors can be correlated with infrared camera data. Data from other devices and sensors can be used to perform calibration, e.g., to verify the presence of others in the bed with the subject.

In some implementations, latency may also be determined during calibration. For example, the processor 210 and/or the sleep monitoring network 205 may determine a delay factor that indicates how long a subject's body takes to adapt to surrounding temperatures. A subject's body temperature may initially be similar to ambient temperature, but after entering the subject's bed, the subject's body temperature will gradually settle at a resting body temperature. The latency factor can be used to estimate and predict a subject's body temperature.

Calibration data may be used to compensate for the effects of the environmental factors on any subject body temperature determinations. For example, data for a particular subject may not be used for determining body temperature or sleep stage until the latency period is over. In other cases, any effects of contact with other humans such as spikes in body temperature data may be removed or treated before the subject's data is used for sleep pattern determination.

After performing calibration, the sleep monitoring network 205 may monitor the subject's sleep by obtaining thermal images (226). The thermal images may be obtained continuously, periodically, or at predetermined times and durations. In other implementations, this monitoring includes obtaining thermal images in addition to data from other sensors such as thermometers, non-thermal video cameras, humidity sensors, motion sensors placed on the subject or in the subject's bed, and, in general, any other device utilized for obtaining data while monitoring the subject is asleep. The obtained data including the thermal images are then transmitted to the processor 210 from the sleep monitoring network 205 (228).

The processor 210 processes the monitoring data received from the sleep monitoring network 205 (230). In processing the received monitoring data, the processor 210 may generate and/or build a model for the subject. The model may include one or more parameters such as the starting temperature and humidity levels, ambient temperature and humidity levels in the resting area, the temperature and humidity levels when measurements were ended, a latency factor, obstructive items (e.g., blankets, persons, or other objects in the bed), and any details regarding the subject. These details may include height, weight, age, gender, and any other personal information the subject has agreed to disclose. Other known details may include a history of the subject's sleeping patterns, habits, and relevant medical history.

Based on the model developed for the subject and the received monitoring data, the processor 210 may determine a likely time that the subject fell asleep, the body temperature of the subject and the most likely stage(s) of sleep the subject is in for the duration of time that data was obtained. For example, the processor 210 can monitor the movement of a subject, and when the movement falls below a movement threshold for a determined period of time, the processor 210 may determine that the subject is likely asleep from the time that the determined time period was satisfied. The processor 210 may determine patterns of sleep, the particular stage of sleep, the time the stage of sleep likely started, likely ended, the duration, and any incidents or qualify indicator associated with the sleep stage.

In more detail, as described above, thermal images reflect different temperatures with different colors or intensities. The processor 201 may use the colors in the thermal images to determine the temperature at different parts of a subject's body. The temperatures across the subject's body are aggregated and, in some cases, weighted to determine the aggregate body temperature of the subject. Data from the subject's model, such as height, weight, age, etc., may be used to normalize body temperature determinations. In addition, as noted above, any collected data may be treated for calibration purposes and/or to compensate for latency.

After determining a subject's body temperature, the processor 210 may determine a stage of sleep using one or more factors. For example, in some implementations in which a high resolution camera is being used that can capture a subject's eyes, if the subject's eyes are open then the processor 210 may determine that the person is awake or may suffer from a nocturnal lagophthalmos condition. In some implementations, if the processor 210 detects images indicating that the subject is experiencing rapid eye movement, then then the processor 210 may determine that the subject is in stage three sleep.

As described above, in some implementations, the processor 210 may map the aggregate body temperature of the subject to a particular stage of sleep using a mapping table. In some implementations, the processor 210 may use a change in the aggregate body temperature of the subject from the time the subject likely fell asleep to the current time to determine the subject's sleep stage. In some implementations, the processor 210 may monitor the amount of time the subject has been asleep and determine candidate states of sleep based on the amount of time the subject has been asleep. In some implementations, the processor 210 may use a combination of any of the above-noted factors to determine the stage of sleep of the subject.

As an example, a stage of sleep can be determined by a subject's starting and/or ending aggregate body temperature and an amount of change in the subject's aggregate body temperature between the subject's starting and ending aggregate body temperatures. In particular, the processor 210 may determine that the aggregate body temperature of a subject was approximately 98° Fahrenheit (F) at the time the subject likely fell asleep. At a subsequent point of time, e.g., 1 hour, the processor 210 may determine that the subject's body temperature has dropped by 0.5° F. to 97.5° F. Based on the aggregate temperature of 97.5° F. and the amount of change in the aggregate temperature 0.5° F., the processor 219 may determine that the subject is, for example, in the second stage of sleep.

Subsequently, and as described above, the processor 210 may take one or more actions such as setting an alarm clock on a user device(s) 215, transmitting recommendations to the user device(s) 215, and/or instructing the sleep monitoring network 205 to obtain additional thermal images (232).

In some cases, when the user device(s) 215 receives instructions from the processor 210 to set an alarm for a particular time, the user device(s) 215 can set an alarm for the determined alarm time using the alarm application on the user device(s) 215.

In some cases, when the user device(s) 215 receives a sleep enhancing recommendation, the user device(s) 215 may determine whether the subject has approved displaying notifications related to sleep enhancing recommendations. If the subject has approved displaying notifications related to sleep enhancing recommendations, the user device(s) 215 displays the recommendations. For example, if the processor 210 determines that a subject is not spending sufficient time in particular sleep stage that is recommended for the subject, the processor 210 may send the user device(s) 215 information regarding the subject's short sleep time and recommend additional sleep. The recommendation may include one or more tips for improving sleep quality and/or duration of a particular sleep stage. In some implementations, the recommendations can be included in a report indicative of the subject's sleep quality.

In some cases, the processor 210 may determine that the previously obtained images are not sufficient to determine the subject's sleep stage for one or more reasons. For example, the processor 210 may determine that one or more captured images did not have sufficient resolution, suffer from noise greater than a threshold amount, or that a subject is not positioned properly in an image. When the processor 210 determines that the previously obtained images are not sufficient to determine the subject's sleep stage, the processor 210 may transmit instructions to the infrared camera (which is one of the devices in the sleep monitoring network 205) to obtain additional data images. The infrared camera may then return to operation (226) and obtain thermal images while monitoring the subject's sleep.

Figure 3A:
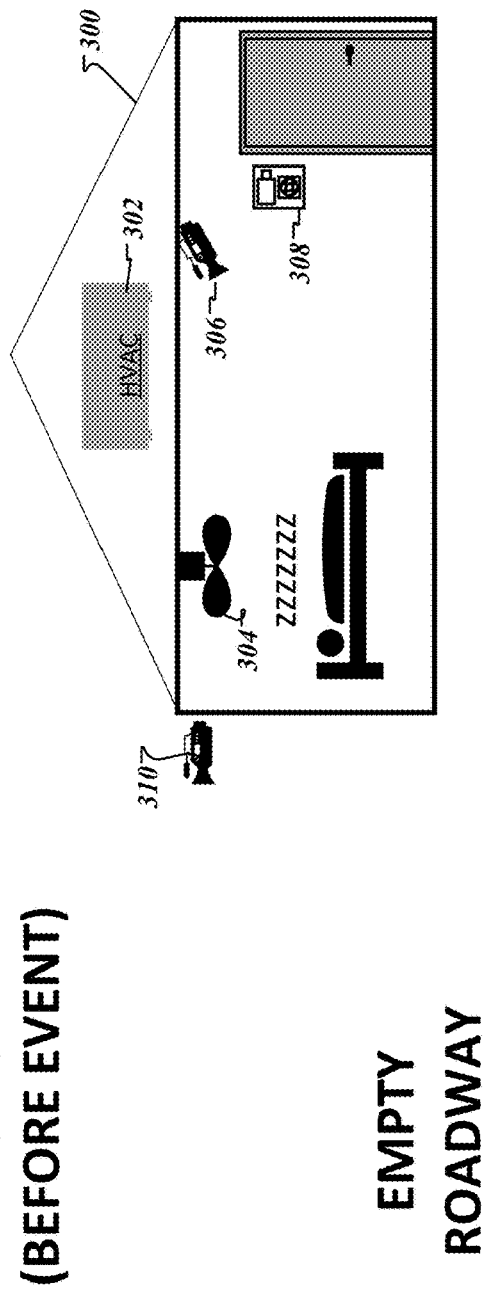
FIGS. 3A and 3B depict an example of a sleep monitoring system integrated with a home monitoring system.
Figure 3B:
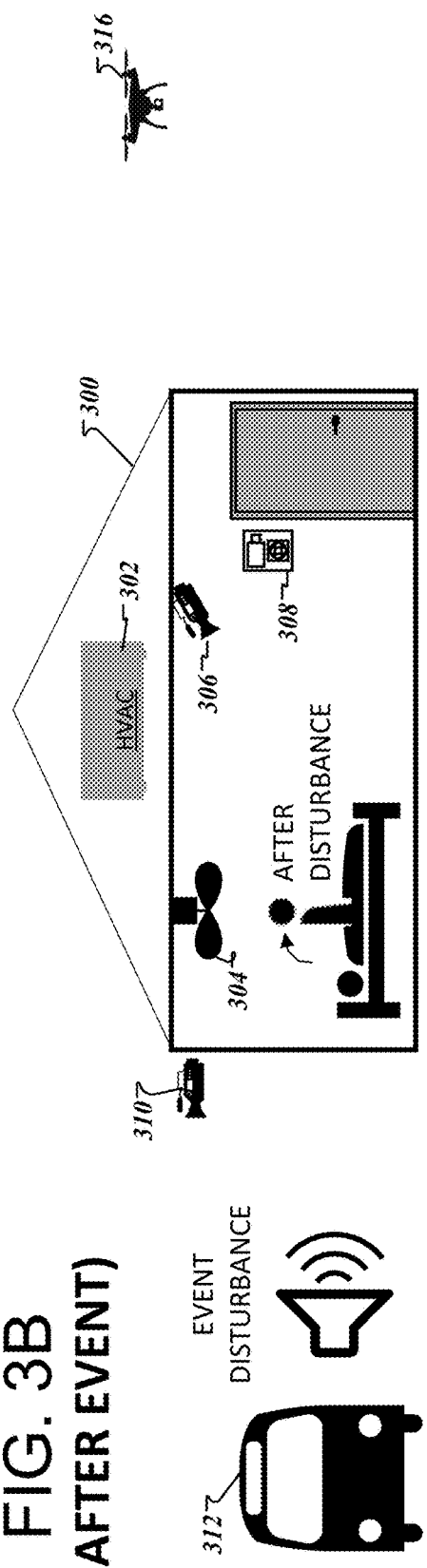

FIGS. 3A and 3B depict implementations in which a sleep monitoring system is integrated with a home monitoring system. In these implementations, the home monitoring system can be used in conjunction with the sleep monitoring system to determine if the subject's sleep has been interrupted by an event, and the impact of such an event on the subject can be monitored.

Referring to FIGS. 3A and 3B, a home monitoring system may monitor a home 300 in one or more ways. The home monitoring system may include various systems and devices such as security camera 310, a Heating, Ventilation, and Air Conditioning (HVAC) system 302, a fan 304, an infrared camera 306, an alarm system 308 coupled to the door of the home. A sleep monitoring system is integrated with the home monitoring system and may include the security camera 310, the infrared camera 306, and the alarm system 308. The home monitoring system may perform various functions such as controlling the internal ambient temperature of the home by controlling devices such as the fan 304 or HVAC 302. The home monitoring system may also monitor and control the lighting in the home, e.g., by controlling the window and door shades in the house to allow or block light from entering the house. In some cases, the home monitoring system may also be coupled to the electric grid of the house so that, for example, one or more light fixtures in the home can be turned on or off.

FIG. 3A depicts an example scenario in which a subject is asleep and the sleep monitoring system is monitoring the subject's sleep. For instance, as explained above with respect to FIGS. 1 and 2, a sleep monitoring system that includes the infrared camera 306 may obtain thermal images of the subject to determine the quantity and quality of the subject's sleep. Because the sleep monitoring system is integrated with the home monitoring system, the sleep monitoring system may also receive data from the home monitoring system to determine environmental factors that may have an impact on the subject's sleep.

In one example, the sleep monitoring system may obtain the ambient temperature set by the HVAC 302 to calibrate any sleep monitoring data obtained while the subject is asleep. In another example, the sleep monitoring system may determine whether the fan 304 is on or off and may calibrate effects the fan 304 has on the body temperature of the subject. In another example, if an intrusion occurs, the alarm system 308 may sound an alarm. If the subject's sleep is disturbed due to the alarm, the sleep monitoring system may obtain data from the home monitoring system indicating that an alarm went off at a particular time, and the sleep monitoring system may record the disturbance and determine any impact of the alarm.

In some cases, a subject may be periodically or intermittently disturbed by varying causes. One example is shown in FIGS. 3A and 3B. In FIG. 3A, a subject is asleep in his house, which is next to a roadway. Due to the proximity of the roadway to the subject's house, the subject may intermittently be disturbed by vehicles or pedestrians passing by the subject's house.

FIG. 3B depicts an example of an event caused by a bus sounding a horn outside of the subject's home 300. In FIG. 3B, the subject is awoken due to the sound of a bus 312 honking a horn outside the subject's home 300. If the sleep monitoring system is not connected to the home monitoring system, such external disturbances may have an impact on the subject's sleep but the sleep monitoring system may not be able to correctly predict, determine, or compensate for such events. However, when the sleep monitoring system is connected to the home monitoring system, the sleep monitoring system can account and compensate for such events.

In particular, the home monitoring system may maintain a record of events and may provide data indicative of the events to the sleep monitoring system. For example, using the external security camera 310, the home monitoring system may be able to record disturbances of people or vehicles passing the subject's home 300. The home monitoring system may record a time and location associated with the disturbance along with a description of the disturbance. The description can be provided by the subject or can be determined based on characteristics of the disturbance, such as sound type, sound level, and/or camera images (described in more detail below with reference to FIG. 4). The home monitoring system may then provide event data to the sleep monitoring system.

The sleep monitoring system may then compare the event data with sleep incidents that occurred during the subject's sleep at the time of the disturbance. If the subject's sleep was disturbed at or around the same time as (or within a threshold time window of) the event, the sleep monitoring system may determine that the event was a cause of the sleep incident and is not reflective of the subject's normal sleeping pattern.

Although FIG. 3B shows the subject sit up in bed as a result of the event, not all events generate such obvious reactions. In several cases, events such as light disturbances or sound disturbances may temporarily agitate a subject resulting in the subject moving a blanket or changing a body position. Such reactions may result in no change or minor changes in the observed body temperature of a subject. The sleep monitoring system can then be used to determine if minor changes in sleep behavior correspond to external disturbances, which can then be used to better characterize the subject's sleeping patterns or external factors that may be having an impact on the subject's sleep.

In some cases, the sleep monitoring system and the home monitoring system may be utilized for expedited responses to emergency situations or generating particular recommendations. For example, if the sleep monitoring system determines that a subject's body temperature is too low (less than a threshold temperature) or too high (greater than a threshold temperature), the sleep monitoring system may send an emergency signal to the home monitoring system. In response, the home monitoring system may activate an emergency protocol which includes, for example, calling one or more of a hospital, an emergency hotline, a police station, and/or a fire department to request assistance in responding to a health emergency of the subject.

In another example, if the home monitoring system determines that a serious incident such as a burglary, theft, break in, or other crime is occurring or has occurred at the home 300, the home monitoring system may send an emergency signal to the sleep monitoring system. In response, the sleep monitoring system may activate an alarm and cause the alarm of the subject's user device to activate. In some cases, assets such as a drone 316 may also be activated to provide additional monitoring of the home 300.

In another example, the sleep monitoring system may rely on data obtained from the home monitoring system to generate sleep behavior recommendations for the subject. For example, integrated thermostat records of home or room ambient temperature obtained from the home monitoring system may be used to suggest thermostat changes or bedding changes that may help to adjust body temperatures more appropriately for improved sleep. Based on the subject's preferences, recommendations may be pushed directly/automatically to thermostat settings controlled by the home monitoring system or may not be executed until the subject consents. In some cases, thermostat settings may be dynamically updated throughout the night in response to real-time sleep monitor data.

In some cases, if light coming in from windows is correlated with disrupted sleep patterns, room-darkening window shades may be recommended. Or if a pattern of pre-sleep lighting (color temperature, or timing) is correlated with poor sleep, light bulb changes might be suggested. In some cases, noise sensors or other sensors integrated with the home monitoring system may detect noise or other events corresponding to sleep interruptions. The sleep monitoring system may then generate recommendations for reducing noise events, e.g., recommendations to place a pet in another room. In some cases, data from the security system and subject models can be used to determine who is entering or leaving a building to determine who may be asleep and/or who is creating disturbance when the subject is asleep. The sleep monitoring system may monitor and differentiate multiple subjects throughout the day even if the subjects sleep in the same bed.

Although the above related examples are tied to the integration of the home and sleep monitoring systems, the sleep monitoring system may also communicate with other monitoring systems to determine the quantity and quality of a subject's sleep. For example, in some cases, data from wearable devices such as smart watches combined with transdermal imaging may be used to match unique heartbeat signatures to one or more sleep stages. In some cases, data from the smart watches combined with transdermal imaging may be used to separately track sleep patterns of multiple subjects over time.

In some cases, transdermal imaging (without a smart watch) can be used to gather cardiovascular data and determine sleep stage and quality. For instance, the cardiovascular data may be used as training data for the subject model described above or as additional data to build the temperature maps described above.

Figure 4:
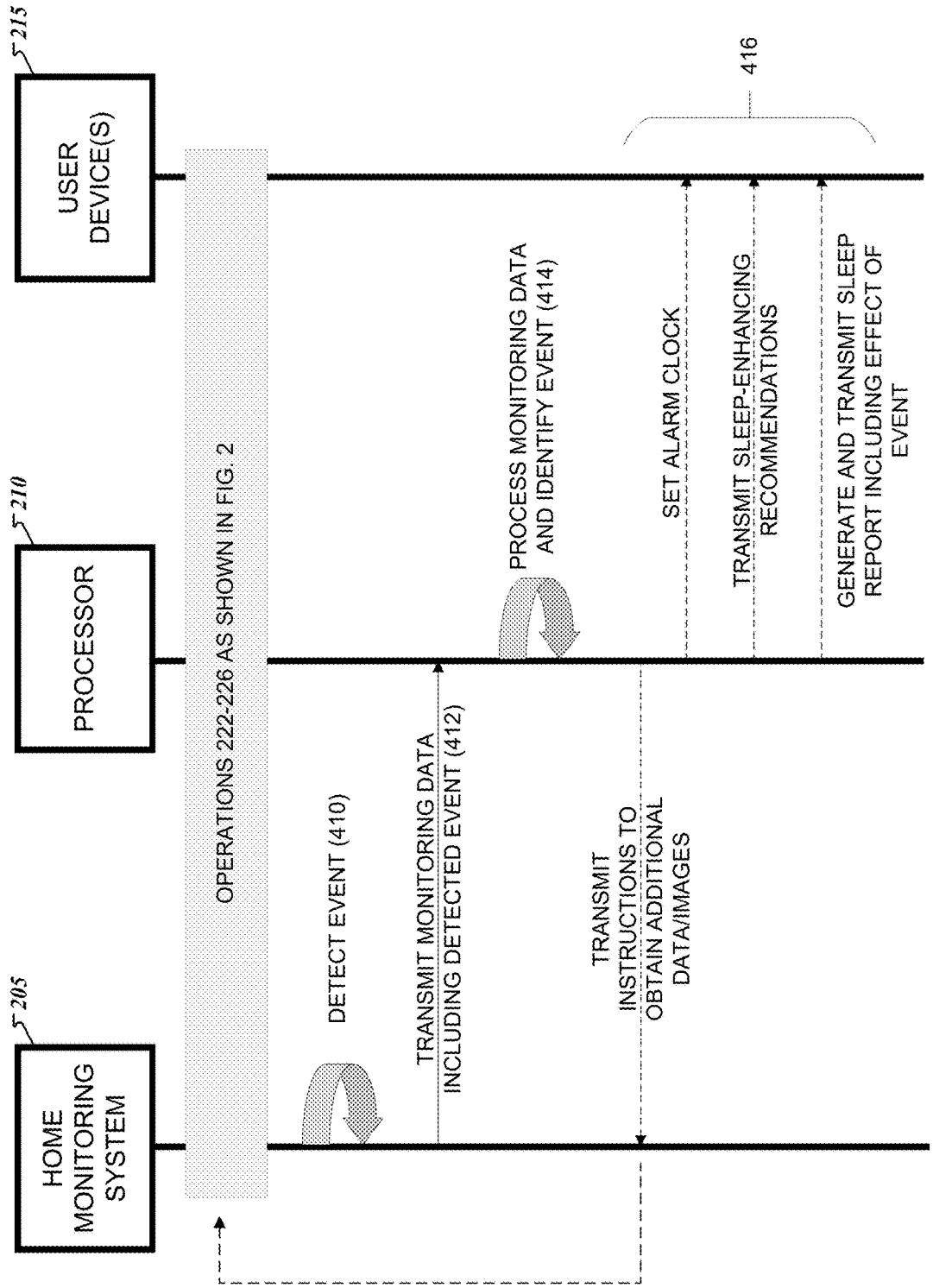
FIG. 4 depicts an example interaction diagram between a home monitoring network, a processor, and a user device(s) according to a sleep monitoring method when a disturbance occurs.

FIG. 4 depicts an interaction diagram between a home monitoring network, a processor, and a user device(s) according to a sleep monitoring method when a disturbance occurs. As shown in FIG. 4, the initial operations are the same as operations 222-226 described with respect to FIG. 2 and the processing of monitoring data in operation 230 may also be implemented in the processing of monitoring data in operation 414 in FIG. 4. The home monitoring system 405 may include, be integrated with, or coupled (directly or indirectly) to the sleep monitoring network 205.

During or after the processor 210 processes the monitoring data (230), the home monitoring system 405 may detect an event (410). As discussed above, various types of events, such as noise disturbances, light disturbances, vehicle disturbances, electrical or ambient disturbances, or human disturbances may occur. One or more devices in the home monitoring system 405 detect the event and store details regarding the event in a log. For example, a time, place, and location of the event may be stored by the home monitoring system 405 in a database that stores an event log.

The home monitoring system 405 may then transmit monitoring data to the processor 210 (412). The monitoring data includes any details regarding the event and thermal images obtained before, during, and/or after the event.

The processor 210 may then process the monitoring data to identify the event and its likely cause (414). For example, as explained above, if a security camera detects a loud noise from a truck outside a subject's home and the sleep monitoring system detects an interruption in the subject's sleep within a threshold time period of the loud noise, the processor 210 may determine that the subject's sleep was disturbed by the truck passing by the subject's house. In another example, if the home monitoring system determines that the ambient temperature in the subject's room was unusually high and the sleep monitoring system detects frequent interruptions in the subject's sleep, the processor 210 may determine that the subject's sleep was disturbed by the unusually high temperature in the subject's room.

It should be understood that various types of events are possible. The processor 210 may use a set of algorithms and rules to classify likely events, predict causes of events, and to correlate events to disturbances in the subject's sleep.

In some cases (as described above with respect to operation 232 in FIG. 2), after processing the monitoring data, the processor 210 may take one or more actions such as setting an alarm clock on a user device(s) 215, transmit sleep-enhancing recommendations to the user device(s) 215, and/or instruct the sleep monitoring network 205 to obtain additional thermal images (416). In FIG. 4, another action the processor 210 may take is to generate a sleep report that includes details describing the event that caused a disturbance, its impact on the sleep, and any possible steps the subject may take to reduce the probability of the event impacting the subject's sleep in future. The generated sleep report may be transmitted to the user device(s) 215 so that the subject may view the sleep report and take an action in response to the event.

Figure 5:
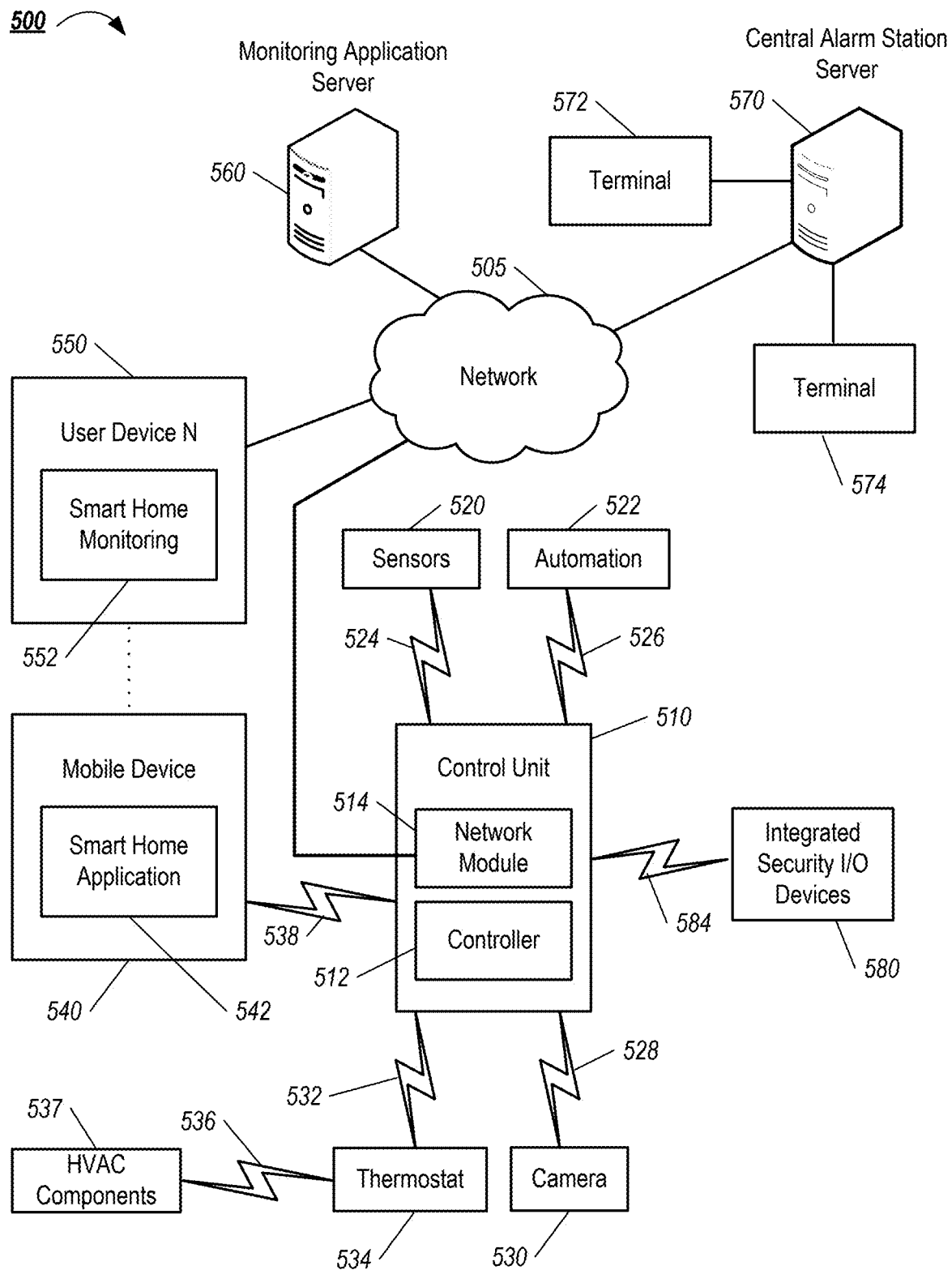
FIG. 5 is a block diagram of an example monitoring network.

Embodiments and all of the functional operations and/or actions described in this specification may be implemented in the example system 500 shown in FIG. 5. The system 500 includes a network 505, a control unit 510, one or more user devices 540 and 550, a monitoring application server 560, and a central alarm station server 570. In some examples, the network 505 facilitates communications between the control unit 510, the one or more user devices 540 and 550, the monitoring application server 560, and the central alarm station server 570.

The network 505 is configured to enable exchange of electronic communications between devices connected to the network 505. For example, the network 505 may be configured to enable exchange of electronic communications, such as alert message or location data provided by a tracker, between the control unit 510, the one or more user devices 540 and 550, the monitoring application server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voiceband modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. In some examples, the sensors 520 may include a radio-frequency identification (RFID) sensor that identifies a particular article that includes a pre-assigned RFID tag.

The control unit 510 communicates with the module 522 and the camera 530 to perform monitoring, e.g., home and/or sleep monitoring. The module 522 is connected to one or more devices that enable sleep monitoring and determination of sleep quantity and quality as described in the implementations above. Also, the module 522 may be connected to one or more cameras and home security systems. Further, the module 522 may be connected to one or more appliances at the property and may be configured to control operation of the one or more appliances. The module 522 may include multiple modules that are each specific to the type of device being controlled in an automated manner. The module 522 may control the one or more devices based on commands received from the control unit 510. For instance, the module 522 may control a lighting system to control the illumination of an area where a subject sleeps. In another example, module 522 may control an HVAC system to control the temperature in the room a subject sleeps in.

The camera 530 may be an infrared camera or other type of optical sensing device configured to capture thermal images. For instance, the camera 530 may be configured to capture images of a subject sleeping. The camera 530 may also capture video images or multiple images at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor near the subject's bed may be built into the camera 530 and used to trigger the camera 530 to capture one or more images when motion is detected. The camera 530 also may include a microwave motion sensor built into the camera and used to trigger the camera 530 to capture one or more images when motion is detected. In some implementations, the camera 530 receives a command to capture an image when external devices detect motion or another potential disturbance event. The camera 530 may receive the command from the controller 512 or directly from one of the sensors 520.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may be powered by the controller's 512 power supply if the camera 530 is co-located with the controller 512.

In some implementations, the camera 530 communicates directly with the monitoring application server 560 or a processing server over the Internet. In these implementations, image data captured by the camera 530 does not pass through the control unit 510 and the camera 530 receives commands related to operation from the monitoring application server 560.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a property and/or environmental data at a property, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534.

A module 537 is connected to one or more components of an HVAC system associated with a property, and is configured to control operation of the one or more components of the HVAC system. In some implementations, the module 537 may be configured to monitor activity of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices. The robotic devices may be any type of robots that are capable of moving and taking actions that assist in security monitoring. For example, the robotic devices may include drones that are capable of moving throughout a property based on automated control technology and/or user input control provided by a subject. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices may be robotic devices that are intended for other purposes and merely associated with the system 500 for use in appropriate circumstances. For instance, a tracker may be associated with the monitoring system 500 as one of the robotic devices and may be controlled to take action responsive to monitoring system events.

In some examples, the robotic devices may include data capture and recording devices. In these examples, the robotic devices may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the area and subjects in the area.

In some implementations, the robotic devices may include output devices. In these implementations, the robotic devices may include one or more displays, one or more speakers, and/or any type of output devices that allow the robotic devices to communicate information to a nearby subject.

The system 500 further includes one or more integrated security devices 580. The one or more integrated security devices 580 may include any type of device, such as the tracker, used to provide or receive alerts based on received sensor data. For instance, the one or more control units 510 may receive one or more alerts from the one or more integrated security input/output devices. Additionally, the one or more control units 510 may receive one or more sensor data from the sensors 520 and determine whether to provide an alert to the one or more integrated security input/output devices 580.

The sensors 520, the module 522, the camera 530, the thermostat 534, and the integrated security devices 580 communicate with the controller 512 over communication links 524, 526, 528, 532, 584, and 586. The communication links 524, 526, 528, 532, 584, and 586 may be a wired or wireless data pathway configured to transmit signals from the sensors 520, the module 522, the camera 530, the thermostat 534, and the integrated security devices 580 to the controller 512. The sensors 520, the module 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 584, and 586 may include a local network. The sensors 520, the module 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 5 (CAT6) wired Ethernet network. The local network may be a mesh network constructed based on the devices connected to the mesh network.

The monitoring application server 560 or processing server is an electronic device configured to provide monitoring services by exchanging electronic communications with the control unit 510, the one or more user devices 540 and 550, and the central alarm station server 570 over the network 505. For example, the monitoring application server 560 may be configured to monitor events (e.g., alarm events) generated by the control unit 610. In this example, the monitoring application server 660 may exchange electronic communications with the network module 514 included in the control unit 510 to receive information regarding events (e.g., alerts) detected by the control unit server 104a. The monitoring application server 560 also may receive information regarding events from the one or more user devices 540 and 550 or the integrated security devices 580.

In some examples, the monitoring application server 560 may route alert data received from the network module 514 or the one or more user devices 540 and 550 to the central alarm station server 570. For example, the monitoring application server 560 may transmit the alert data to the central alarm station server 570 over the network 505.

The monitoring application server 560 may store sensor and image data received from the monitoring system and perform analysis of sensor and image data received from the monitoring system. Based on the analysis, the monitoring application server 560 may communicate with and control aspects of the control unit 510 or the one or more user devices 540 and 550.

The central alarm station server 570 is an electronic device configured to provide alarm monitoring service by exchanging communications with the control unit 510, the one or more mobile devices 540 and 550, the integrated security devices 580, and the monitoring application server 560 over the network 505. For example, the central alarm station server 570 may be configured to monitor alerting events. In this example, the central alarm station server 570 may exchange communications with the network module 514 included in the control unit 510 to receive information regarding alerting events detected by the control unit 510. The central alarm station server 570 also may receive information regarding alerting events from the one or more mobile devices 540 and 550 and/or the monitoring application server 560.

The central alarm station server 570 is connected to multiple terminals 572 and 574. The terminals 572 and 574 may be used by operators to process disturbance events. For example, the central alarm station server 570 may route alerting data (e.g., data indicative of the disturbance events) to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating an event likely to cause a disturbance in the subject's sleep. The central alarm station server 570 may receive the alerting data and route the alerting data to the terminal 572 for processing by an operator associated with the terminal 572. The terminal 572 may render a display to the operator that includes information associated with the alerting event and the operator may handle the alerting event based on the displayed information.

In some implementations, the terminals 572 and 574 may be mobile devices or devices designed for a specific function. The one or more user devices 540 and 550 are devices that host and display user interfaces. For instance, the user device 540 is a mobile device that hosts one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout this specification. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data, sleep recommendations, and event disturbances, from the monitoring system.

The user device 550 may be a general-purpose computer (e.g., a desktop personal computer, a workstation, or a laptop computer) that is configured to communicate with the monitoring application server 560 and/or the control unit 510 over the network 505. The user device 550 may be configured to display a smart home user interface 552 that is generated by the user device 550 or generated by the monitoring application server 560. For example, the user device 550 may be configured to display a user interface (e.g., a web page) provided by the monitoring application server 560 that enables a user to perceive images captured by the camera 530 and/or event reports.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Zwave, Zigbee, HomePlug (ethernet over powerline), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring application server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring application server 560 may relay data received from the control unit 510 to the one or more user devices 540 and 550 through the network 505. In this regard, the monitoring application server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring application server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring application server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 only includes the one or more user devices 540 and 550, the sensors 520, the module 522, the camera 530, and the robotic devices. The one or more user devices 540 and 550 receive data directly from the sensors 520, the module 522, the camera 530, and the robotic devices and sends data directly to the sensors 520, the module 522, the camera 530, and the robotic devices. The one or more user devices 540, 550 provide the appropriate interfaces/processing to provide visual surveillance and reporting.

In some implementations, the system 500 further includes network 505 and the sensors 520, the module 522, the camera 530, the thermostat 534, and the robotic devices are configured to communicate sensor and image data to the one or more user devices 540 and 550 over network 505 (e.g., the Internet, cellular network, etc.). In some implementations, the sensors 520, the module 522, the camera 530, the thermostat 534, and the robotic devices (or a component, such as a bridge/router) are intelligent enough to change the communication pathway from a direct local pathway when the one or more user devices 540 and 550 are in close physical proximity to the sensors 520, the module 522, the camera 530, the thermostat 534, and the robotic devices to a pathway over network 505 when the one or more user devices 540 and 550 are farther from the sensors 520, the module 522, the camera 530, the thermostat 534, and the robotic devices. In some examples, the system leverages GPS information from the one or more user devices 540 and 550 to determine whether the one or more user devices 540 and 550 are close enough to the sensors 520, the module 522, the camera 530, the thermostat 534, and the robotic devices to use the direct local pathway or whether the one or more user devices 540 and 550 are far enough from the sensors 520, the module 522, the camera 530, the thermostat 534, and the robotic devices that the pathway over network 505 is required. In other examples, the system leverages status communications (e.g., pinging) between the one or more user devices 540 and 550 and the sensors 520, the module 522, the camera 530, the thermostat 534, and the robotic devices to determine whether communication using the direct local pathway is possible. If communication using the direct local pathway is possible, the one or more user devices 540 and 550 communicate with the sensors 520, the module 522, the camera 530, the thermostat 534, and the robotic devices using the direct local pathway. If communication using the direct local pathway is not possible, the one or more user devices 540 and 550 communicate with the sensors 520, the module 522, the camera 530, the thermostat 534, and the robotic devices using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 uses several techniques to reduce costs while providing access to significant levels of useful visual information.

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "Away" state, but set not to capture images when the alarm system is armed in a "Stay" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example, semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

A computer program, also known as a program, software, software application, script, plug-in, or code, may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data in a single file dedicated to the program in question, or in multiple coordinated files. A computer program may be executed on one computer or on multiple computers that are located at one site or distributed across multiple sites and interconnected by a communication network.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be claimed as such, one or more features from a claimed combination may, in some cases, be excised from the combination, and the claimed combination may be directed to a sub-combination or variation of a sub-combination.

Similarly, the separation of various system components in the embodiments described above should not be understood as requiring such separation in all embodiments, and it should be understood that the described program components and systems may generally be integrated together in a single software product or packaged into multiple software products. For example, although some operations are described as being performed by a processing server, one of more of the operations may be performed by the smart meter or other network components.

It should be understood that the phrase one or more of and the phrase at least one of include any combination of elements. For example, the phrase one or more of A and B includes A, B, or both A and B. Similarly, the phrase at least one of A and B includes A, B, or both A and B.

Thus, particular implementations have been described. Other implementations are within the scope of the following claims. For example, the actions recited in the claims may be performed in a different order and still achieve desirable results.

What is claimed is:
1. A computer-implemented method comprising:
accessing, by a system comprising one or more computers and one or more non-transitory computer-readable storage media and from an infrared camera connected to the system through a computer network, a thermal image of a person in a resting area;
determining, by the system, a predicted body temperature of the person using the thermal image;
determining, by the system, a sleep stage of the person using the predicted body temperature;
receiving, by the system and from a monitoring system, data indicating a likelihood of an audio event at the resting area;
predicting, by the system and using the data indicating the likelihood of the audio event at the resting area, a likelihood that the audio event will likely affect the sleep stage of the person;
performing, by the system, sleep monitoring analysis for the person using sleep pattern data that indicates a sleeping pattern for the person;
obtaining, by the system, sleep event data fora sleep event indicating whether or not sleep of the person is disturbed, wherein the sleep event data comprises a change in the predicted body temperature of the person that is predicted using the thermal image; and in response to detecting that the audio event has occurred in the resting area, performing, by the system, one or more actions to compensate for the audio event, comprising:
  determining whether or not the sleep of the person is disturbed within a threshold time period of the audio event;
    in response to determining that the sleep of the person is disturbed within the threshold time period of the audio event,
      updating, by the system, the sleep pattern data to indicate that the sleep event data is not reflective of a normal sleep pattern of the person and that the sleep event indicating that the sleep of the person was disturbed was likely caused by the audio event; and
      performing, by the system and using the updated sleep pattern data, future sleep monitoring analysis differently than would otherwise occur if the sleep pattern data was not updated; and
  setting a sleep application on an electronic device differently than would otherwise be configured if the audio event had not occurred.

2. The computer-implemented method of claim 1, wherein determining the predicted body temperature of the person using the thermal image comprises:
  determining one or more predicted temperatures of one or more parts, respectively, of a body of the person;
  identifying one or more weights associated with the one or more parts, respectively, of the body of the person; and
  determining an aggregate body temperature of the person using a combination of respective values from the one or more predicted temperatures of the one or more parts and the one or more weights associated with the one or more parts of the body of the person.

3. The computer-implemented method of claim 2, wherein the one or more weights associated with the one or more parts, respectively, of the body of the person comprises:
  a first weight designated to a first part of the body that is not exposed to an ambient environment;
  a second weight designated to a second part of the body that is exposed to the ambient environment; and
  the first weight is greater than the second weight.

4. The computer-implemented method of claim 2, wherein determining the sleep stage of the person based on the predicted body temperature comprises mapping the aggregate body temperature to a particular sleep stage; and
  wherein the particular sleep stage comprises one of a stage one light sleep, a stage two light sleep, and a stage three deep sleep.

5. The computer-implemented method of claim 4, wherein mapping the aggregate body temperature to the particular sleep stage comprises at least one of:
  determining that the person is in the stage one light sleep when the aggregate body temperature of the person is within a first range of body temperatures associated with the stage one light sleep;
  determining that the person is in the stage two light sleep when the aggregate body temperature of the person is within a second range of body temperatures associated with the stage two light sleep; or
  determining that the person is in the stage three deep sleep when the aggregate body temperature of the person is within a third range of body temperatures associated with the stage three deep sleep.

6. The computer-implemented method of claim 1, wherein determining the sleep stage of the person using the predicted body temperature comprises:
  determining the predicted body temperature of the person at a first time;
  determining the predicted body temperature of the person at a second time different from the first time;
  determining a change in the predicted body temperature of the person between the first time and the second time; and
  determining the sleep stage of the person using the change in the predicted body temperature.

7. The computer-implemented method of claim 1, comprising:
  determining a time period of the sleep stage that the person was at when the thermal image was obtained based on the thermal image and the predicted body temperature.

8. The computer-implemented method of claim 1, comprising performing calibration by:
  determining a first initial predicted body temperature of the person before the person adopts a sleeping position;
  determining a second initial predicted body temperature of the person after the person adopts the sleeping position;
  obtaining data indicative of an environment around the person when the person adopts the sleeping position, wherein the data indicative of the environment around the person comprises one or more of data indicative of an ambient temperature and humidity around the person; and
  supplementing data obtained for determining the predicted body temperature of the person using the first initial predicted body temperature, the second initial predicted body temperature, and the data indicative of the environment around the person.

9. A system comprising one or more computers and one or more non-transitory computer-readable media encoded with storage devices on which are stored instructions that are operable, when executed by the one or more computers, to cause the one or more computers to perform operations comprising:
  accessing, from an infrared camera connected to the system through a computer network, a thermal image of a person in a resting area;
  determining a predicted body temperature of the person using the thermal image;
  determining a sleep stage of the person using the predicted body temperature;
  receiving, from a monitoring system, data indicating a likelihood of an audio event at the resting area;
  predicting, using the data indicating the likelihood of the audio event at the resting area, that the audio event will likely affect the sleep stage of the person;
  performing sleep monitoring analysis for the person using sleep pattern data that indicates a sleep pattern for the person;
  obtaining sleep event data for a sleep event indicating that sleep of the person is disturbed, wherein the sleep event data comprises a change in the predicted body temperature of the person that is predicted using the thermal image;
  detecting that the audio event has occurred in the resting area; and
  in response to detecting that the audio event has occurred, performing one or more actions to compensate for the audio event, comprising:

determining that the sleep of the person is disturbed within a threshold time period of the audio event;

in response to determining that the sleep of the person is disturbed within the threshold time period of the audio event, updating the sleep pattern data to indicate that the sleep event data is not reflective of a normal sleep pattern of the person and that the sleep event indicating that the sleep of the person was disturbed was likely caused by the audio event; and performing, using the updated sleep pattern data, future sleep monitoring analysis differently than would otherwise occur if the sleep pattern data was not updated; and transmitting, from the system to an electronic device through the computer network, a computer instruction to cause the electronic device to be configured differently than would otherwise be configured if the audio event had not occurred.

10. The system of claim 9, wherein determining the predicted body temperature of the person using the thermal image comprises:

determining one or more predicted temperatures of one or more parts, respectively, of a body of the person;

identifying one or more weights associated with the one or more parts, respectively, of the body of the person; and determining an aggregate body temperature of the person using a combination of respective values from the one or more predicted temperatures of the one or more parts and the one or more weights associated with the one or more parts of the body of the person.

11. The system of claim 10, wherein determining the sleep stage of the person based on the predicted body temperature comprises mapping the aggregate body temperature to a particular sleep stage; and wherein the particular sleep stage comprises one of a stage one light sleep, a stage two light sleep, and a stage three deep sleep.

12. The system of claim 11, wherein mapping the aggregate body temperature to the particular sleep stage comprises at least one of:

determining that the person is in the stage one light sleep when the aggregate body temperature of the person is within a first range of body temperatures associated with the stage one light sleep;

determining that the person is in the stage two light sleep when the aggregate body temperature of the person is within a second range of body temperatures associated with the stage two light sleep; or determining that the person is in the stage three deep sleep when the aggregate body temperature of the person is within a third range of body temperatures associated with the stage three deep sleep.

13. The system of claim 9, wherein determining the sleep stage of the person using the predicted body temperature comprises:

determining the predicted body temperature of the person at a first time;

determining the predicted body temperature of the person at a second time different from the first time;

determining a change in the predicted body temperature of the person between the first time and the second time; and determining the sleep stage of the person using the change in the predicted body temperature.

14. The system of claim 9, the operations comprising:

determining a time period of the sleep stage that the person was at when the thermal image was obtained based on the thermal image and the predicted body temperature.

15. The system of claim 9, the operations comprising performing calibration by:

determining a first initial predicted body temperature of the person before the person adopts a sleeping position;

determining a second initial predicted body temperature of the person after the person adopts the sleeping position;

obtaining data indicative of an environment around the person when the person adopts the sleeping position, wherein the data indicative of the environment around the person comprises one or more of data indicative of an ambient temperature and humidity around the person; and supplementing data obtained for determining the predicted body temperature of the person using the first initial predicted body temperature, the second initial predicted body temperature, and the data indicative of the environment around the person.

16. One or more non-transitory computer-readable storage media encoded with instructions that, when executed by one or more computers, cause the one or more computers to perform operations comprising:

accessing, from an infrared camera connected to the one or more computers through a computer network, a thermal image of a person in a resting area;

determining a predicted body temperature of the person using the thermal image;

determining a sleep stage of the person using the predicted body temperature;

receiving, from a monitoring system, data indicating a likelihood of an audio event at the resting area;

predicting, using the data indicating the likelihood of the audio event at the resting area, that the audio event will likely affect the sleep stage of the person;

performing sleep monitoring analysis for the person using sleep pattern data that indicates a sleep pattern for the person;

obtaining sleep event data for a sleep event indicating that sleep of the person is disturbed, wherein the sleep event data comprises a change in the predicted body temperature of the person that is predicted using the thermal image;

detecting that the audio event has occurred in the resting area; and in response to detecting that the audio event has occurred, performing one or more actions to compensate for the audio event, comprising:

determining that the sleep of the person is disturbed within a threshold time period of the audio event;

in response to determining that the sleep of the person is disturbed within the threshold time period of the audio event, updating the sleep pattern data to indicate that the sleep event data is not reflective of a normal sleep pattern of the person and that the sleep event indicating that the sleep of the person was disturbed was likely caused by the audio event; and performing, using the updated sleep pattern data, future sleep monitoring analysis differently than would otherwise occur if the sleep pattern data was not updated; and transmitting, from the one or more computers to an electronic device through the computer network, a computer instruction to cause the electronic device to be configured differently than would otherwise be configured if the audio event had not occurred.

17. The non-transitory computer-readable storage media of claim 16, wherein:
determining the predicted body temperature of the person using the thermal image comprises:
   determining one or more predicted temperatures of one or more parts, respectively, of a body of the person;
   identifying one or more weights associated with the one or more parts, respectively, of the body of the person; and
   determining an aggregate body temperature of the person using a combination of respective values from the one or more predicted temperatures of the one or more parts and the one or more weights associated with the one or more parts of the body of the person;
wherein determining the sleep stage of the person based on the predicted body temperature comprises mapping the aggregate body temperature to a particular sleep stage; and
wherein the particular sleep stage comprises one of a stage one light sleep, a stage two light sleep, and a stage three deep sleep.

18. The computer-implemented method of claim 1, wherein the audio event is caused by a source outside the resting area.

19. The computer-implemented method of claim 18, wherein the audio event is caused by a vehicle.

20. The non-transitory computer-readable storage media of claim 16, wherein the audio event is caused by a source outside the resting area.

* * * * *

UNITED STATES PATENT AND TRADEMARK OFFICE
CERTIFICATE OF CORRECTION

| | |
|---|---|
| PATENT NO. | : 12,440,151 B2 |
| APPLICATION NO. | : 17/173977 |
| DATED | : October 14, 2025 |
| INVENTOR(S) | : Ethan Shayne, Dana Eubanks and Donald Gerard Madden |

Page 1 of 1

It is certified that error appears in the above-identified patent and that said Letters Patent is hereby corrected as shown below:

In the Claims

Column 24, Line 63, Claim 1, please delete "fora" and insert therefor -- for a --;

Column 26, Line 58, Claim 9, please delete "fora" and insert therefor -- for a --; and Column 28, Line 44, Claim 16, please delete "fora" and insert therefor -- for a --.

Signed and Sealed this
Ninth Day of December, 2025

John A. Squires
*Director of the United States Patent and Trademark Office*